(12) United States Patent
Lawson et al.

(10) Patent No.: US 10,412,085 B2
(45) Date of Patent: Sep. 10, 2019

(54) AUTHENTICATING AN AIRCRAFT DATA EXCHANGE USING DETECTED DIFFERENCES OF ONBOARD ELECTRONICS

(71) Applicant: The Boeing Company, Chicago, IL (US)

(72) Inventors: Jack Lawson, Mercer Island, WA (US); Timothy M. Mitchell, Seattle, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 16/176,870

(22) Filed: Oct. 31, 2018

(65) Prior Publication Data
US 2019/0075110 A1    Mar. 7, 2019

Related U.S. Application Data

(63) Continuation of application No. 15/378,405, filed on Dec. 14, 2016, now Pat. No. 10,148,653.

(51) Int. Cl.
| *H04L 29/06* | (2006.01) |
| *G06F 16/25* | (2019.01) |
| *H04L 29/08* | (2006.01) |
| *H04L 9/32* | (2006.01) |
| *G06F 21/44* | (2013.01) |

(Continued)

(52) U.S. Cl.
CPC ............ *H04L 63/0876* (2013.01); *G06F 7/02* (2013.01); *G06F 16/25* (2019.01); *G06F 21/44* (2013.01); *H04L 9/3278* (2013.01); *H04L 67/12* (2013.01); *H04W 12/06* (2013.01); *H04W 12/08* (2013.01); *H04W 4/70* (2018.02)

(58) Field of Classification Search
CPC ... H04L 63/0876; H04L 67/12; H04L 9/3278; G06F 16/25; G06F 21/44; G06F 7/02; H04W 12/08; H04W 12/06; H04W 4/70
See application file for complete search history.

(56) References Cited

U.S. PATENT DOCUMENTS 8,589,020 B1* 11/2013 Angus ................. G06F 11/3006
701/29.1
8,667,265 B1* 3/2014 Hamlet ................. H04L 9/0866
326/80

(Continued)

*Primary Examiner* — Darren B Schwartz
(74) *Attorney, Agent, or Firm* — Duft & Bornsen, PC

(57) ABSTRACT

Systems and methods are provided for authenticating aircraft communications using detected difference of on board electronics. One embodiment is a method that includes detecting a request for an exchange of data between an aircraft and an off-board system, and selecting a Line Replaceable Unit (LRU) of the aircraft based on at least one parameter of the request. The method also includes issuing a challenge to a Physically Unclonable Function (PUF) connected with at least one electronic component of the LRU, and obtaining a hardware signature based on a response of the at least one electronic component of the LRU to the challenge. The PUF derives the hardware signature from a unique physical property of the at least one electronic component. The method further includes validating the hardware signature to authenticate the request and initiate the exchange of data between the aircraft and the off-board system.

20 Claims, 4 Drawing Sheets

(51) Int. Cl.
*G06F 7/02* (2006.01)
*H04W 12/08* (2009.01)
*H04W 12/06* (2009.01)
*H04W 4/70* (2018.01)

(56) References Cited

U.S. PATENT DOCUMENTS

| | | | | |
|---|---|---|---|---|
| 2006/0020782 | A1* | 1/2006 | Kakii | H04L 9/3263 |
| | | | | 713/156 |
| 2008/0279373 | A1* | 11/2008 | Erhart | H04L 9/302 |
| | | | | 380/46 |
| 2009/0138385 | A1* | 5/2009 | Harnish | G06F 21/57 |
| | | | | 705/28 |
| 2009/0138517 | A1* | 5/2009 | McLain | G06F 21/51 |
| 2010/0293384 | A1* | 11/2010 | Potkonjak | H04L 9/3247 |
| | | | | 713/176 |
| 2011/0099371 | A1* | 4/2011 | Roy | H04L 63/0823 |
| | | | | 713/168 |
| 2013/0036103 | A1* | 2/2013 | Lawson | G06F 21/64 |
| | | | | 707/698 |
| 2014/0189890 | A1* | 7/2014 | Koeberl | G06F 21/70 |
| | | | | 726/34 |
| 2015/0058928 | A1* | 2/2015 | Guo | H04L 63/08 |
| | | | | 726/3 |
| 2016/0285864 | A1* | 9/2016 | Canavor | H04L 63/0823 |
| 2017/0134176 | A1* | 5/2017 | Kim | H04W 12/06 |

* cited by examiner

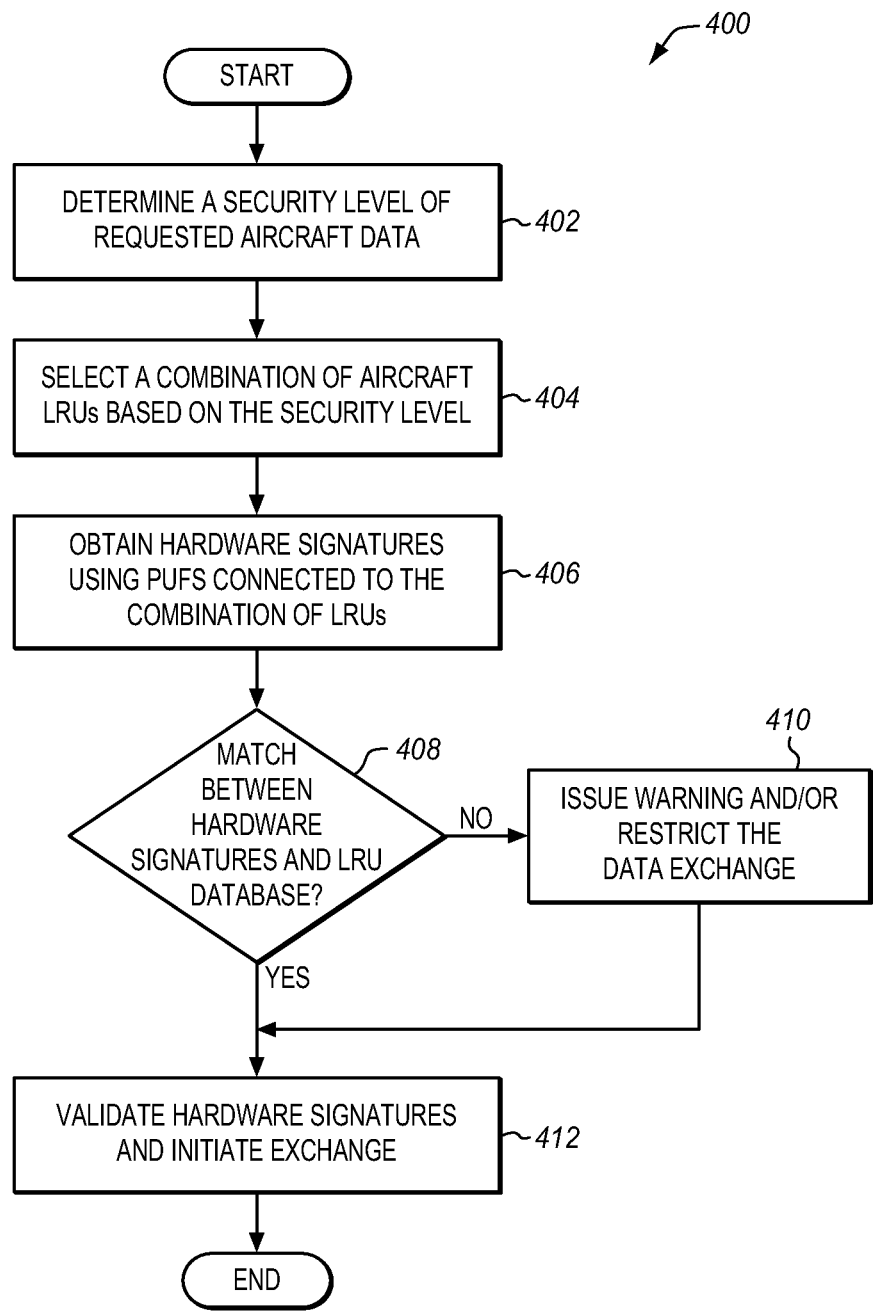

AUTHENTICATING AN AIRCRAFT DATA EXCHANGE USING DETECTED DIFFERENCES OF ONBOARD ELECTRONICS

RELATED APPLICATIONS

This document is a continuation of co-pending U.S. patent application Ser. No. 15/378,405, (filed on Dec. 14, 2016) and identically entitled, which is hereby incorporated by reference.

FIELD

The disclosure relates to aircraft communication, and in particular, to authenticating an aircraft data exchange.

BACKGROUND

When an aircraft is grounded at an airport, an off-board ground system operated by an airline may connect with the aircraft to download prior flight information for analysis or upload new data to the aircraft for future flights. A large amount of data of varying degrees of security importance may be exchanged in a relatively short period of time that the aircraft is grounded. To ensure that the aircraft data is securely transferred between validated parties, a user of the ground system connects to the aircraft using a digital certificate to validate the aircraft's identity and authorize the data exchange. However, this approach to authorizing a data exchange with an aircraft is difficult to maintain over time and is limited in its capability to provide efficient and secure authentication, especially when additional cross-checks and/or varying levels of security clearance is desired.

SUMMARY

Embodiments described herein authenticate an aircraft data exchange using detected differences of onboard electronics. A unique hardware signature is obtained from a manufacturing variable inherent in an electrical component of an on-board system of the aircraft. The unique hardware signature may then be used in an automatic, machine-to-machine authentication of the aircraft.

One embodiment is a method that includes detecting a request for an exchange of data between an aircraft and an off-board system, and selecting a Line Replaceable Unit (LRU) of the aircraft based on at least one parameter of the request. The method also includes issuing a challenge to a Physically Unclonable Function (PUF) connected with at least one electronic component of the LRU, and obtaining a hardware signature based on a response of the at least one electronic component of the LRU to the challenge. The PUF derives the hardware signature from a unique physical property of the at least one electronic component. The method further includes validating the hardware signature to authenticate the request and initiate the exchange of data between the aircraft and the off-board system.

Other exemplary embodiments (e.g., methods, systems, and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 4 is a flowchart of a method for authenticating an aircraft data exchange in another exemplary embodiment.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
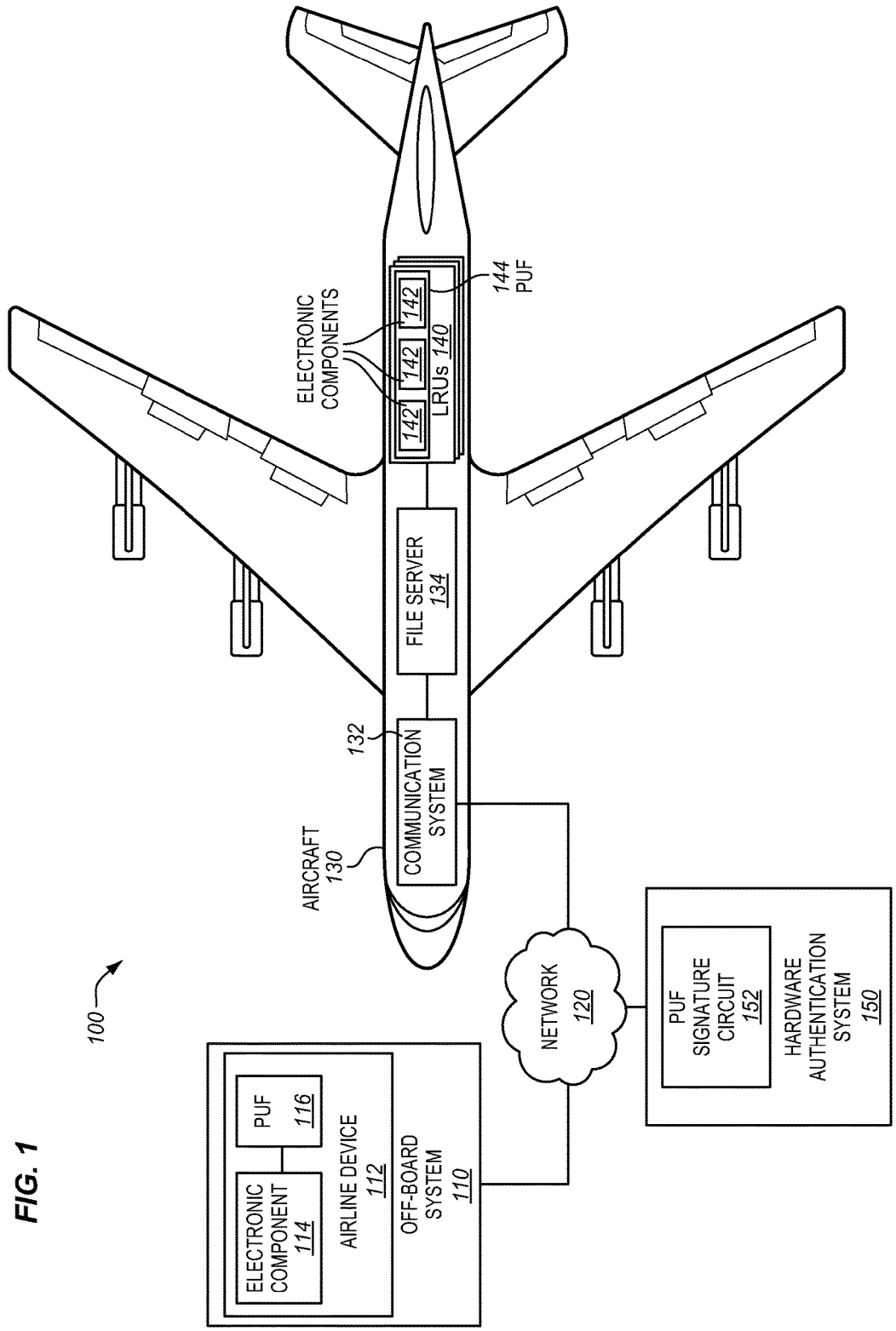
FIG. 1 illustrates a system for exchanging aircraft data in an exemplary embodiment.

FIG. 1 illustrates a system 100 for exchanging aircraft data in an exemplary embodiment. The system 100 includes one or more off-board system(s) 110, network(s) 120, and aircraft(s) 130. As an aircraft 130 lands and/or approaches within sufficient proximity to an off-board system 110, a connection may be established over a network 120 for exchanging aircraft data (e.g., aircraft software parts, commands, flight operation logs, etc.) between the aircraft 130 and the external off-board system 110 which is separate and external to the aircraft 130. The off-board system 110 may be implemented in a ground system operated by an airline, airport, military unit, or other entity which manages a fleet of aircrafts 130. Accordingly, the off-board system 110 may include one or more airline devices 112 (e.g., computers, laptops, smartphones, etc.) of varying security clearances that transfer aircraft data on behalf of the ground system. Alternatively or additionally, the off-board system 110 may be implemented in another aircraft that exchanges data with the aircraft 130.

Each aircraft 130 includes a communication system 132, a file server 134, and multiple Line Replaceable Units (LRUs) 140. The communication system 132 may include any combination of communication devices/interfaces operable to exchange data with an off-board system 110 that is external to the aircraft 130 via the network 120. The network 120 may include any combination of wired or wireless communication mediums. The file server 134 may comprise a database, file system, and/or other architecture operable to store/distribute aircraft data for the internal on-board systems and devices of the aircraft 130.

The LRUs 140 represent the on-board systems of the aircraft 130. Each LRU 140 may perform a specific function for the aircraft 130 that operates in relative isolation from other LRUs 140 to provide modularity in aircraft operations and to facilitate troubleshooting and maintenance (e.g., software updates, component replacements, etc.). Exemplary LRUs 140 include a Flight Control Computer (FCC) that supports autopilot features, an In-Flight Entertainment System (IFES) that displays video for passengers, a Proximity Switching Electronics Unit (PSEU) that monitors that status of switches and sensors, and a Central Maintenance Computer (CMC) that compiles maintenance records, among many others. Thus, each LRU 140 may include its own electronic components 142 (e.g., integrated circuit(s), processor(s), memory, etc.).

In avionics, it is common for a type of LRU 140 (e.g., FCC, IFES, etc.) to be produced en masse using the same silicon fabrication process. The identically manufactured LRUs 140 may be distributed to multiple aircrafts 130 which then share a common type of LRU 140 with the same type of electronic component(s) 142, circuit layouts, firmware, software, etc. The redundant nature of LRUs 140 throughout a fleet allows the off-board system 110 to repetitively perform a data exchange routine with each aircraft 130 for efficient fleet management and high quality control. The off-board system 110 may target a specific LRU 140, or combination of LRUs 140, for downloading and/or uploading aircraft data as each aircraft 130 of a fleet comes back into network connection. For instance, the off-board system 110 may retrieve a log of sensor statuses recorded for the Proximity Sensor Electronics Unit (PSEU) during previous flights, send new content to the In-Flight Entertainment System (IFES), and direct a software update for the Flight Control Computer (FCC) for future flights. Thus, a large amount of data of varying degrees of security importance may be exchanged in a relatively short period of time that the aircraft 130 is available for upload/download.

In previous systems, a user of the off-board system 110 (and/or the flight crew of an aircraft 130) manually login to authenticate an aircraft data exchange. Some airline systems implement exchanges of assigned digital certificates to facilitate authentication which requires frequent maintenance and updates to ensure the devices, users, and certificates are appropriately assigned. These approaches to authenticating aircraft data exchanges are cumbersome and difficult to maintain over time and may also be prone to system and user errors that disrupt the timeliness of the data exchange.

The system 100 is therefore enhanced with a hardware authentication system 150 that is operable to authenticate a data exchange between the aircraft 130 and the off-board system 110 using a Physically Unclonable Function (PUF) 144 of an LRU 140. The hardware authentication system 150 includes a PUF signature circuit 152 operable to use the connection of the PUF 144 and one or more electronic component(s) 142 to obtain a digital signature generated from a unique physical/electrical property that marks the electronic component(s) 142 due to small, uncontrollable variations which occur during fabrication/manufacture. By leveraging a mapping of the electronic components 142 and the LRUs 140 for a fleet of aircrafts 130, the hardware authentication system 150 is able to use the unique digital signature to validate the LRU 140 and authenticate the data exchange in an automatic, machine-to-machine transaction without user input or storing/maintaining digital certificates. Alternatively or additionally (e.g., for two-way authentication), the hardware authentication system 150 may use the connection of a PUF 116 and one or more electronic component(s) 114 of an airline device 112 to validate the airline device 112 and authenticate the data exchange. Additionally, as will be described in greater detail below, the hardware authentication system 150 enables highly secure data exchanges with robust cross-checking capability.

It will be appreciated that the system 100 as shown and described herein is exemplary for purposes of illustration and that alternative arrangements and configurations of components are possible. For instance, the hardware authentication system 150 may be integrated with the off-board system 110, the LRUs 140 and/or electronic components 142 of the aircraft 130, a separate system independent from the off-board system 110 and the aircraft 130, or some combination thereof. The PUF 144 may include any type or combination of PUF circuitry (e.g., PUF measurement circuitry, Static Random Access Memory (SRAM) PUF circuitry, delay-based PUF circuitry, ring oscillator PUF circuitry, etc.) and may be implemented as an integrated circuit embedded with the electronic component(s) 142/114, as a component of the hardware authentication system 150, or some combination thereof. The electrical component(s) 142/114 may include a substrate or die (e.g., comprised of crystalline silicon, gallium arsenide (GaAs), or other semiconductors) as well as processors (e.g., Central Processing Units (CPU), microprocessors, Digital Signal Processors (DSPs), Application-specific Integrated Circuits (ASICs), etc.), memory chips, and other materials for forming transistors, resistors, capacitors, and other electrical structures. Accordingly, PUFs 144/116 may be operable to measure a resistance response, capacitance response, a voltage response, or some other physical or electrical silicon property of the electrical component(s) 142/114. Additional details of operation are described below.

Figure 2:
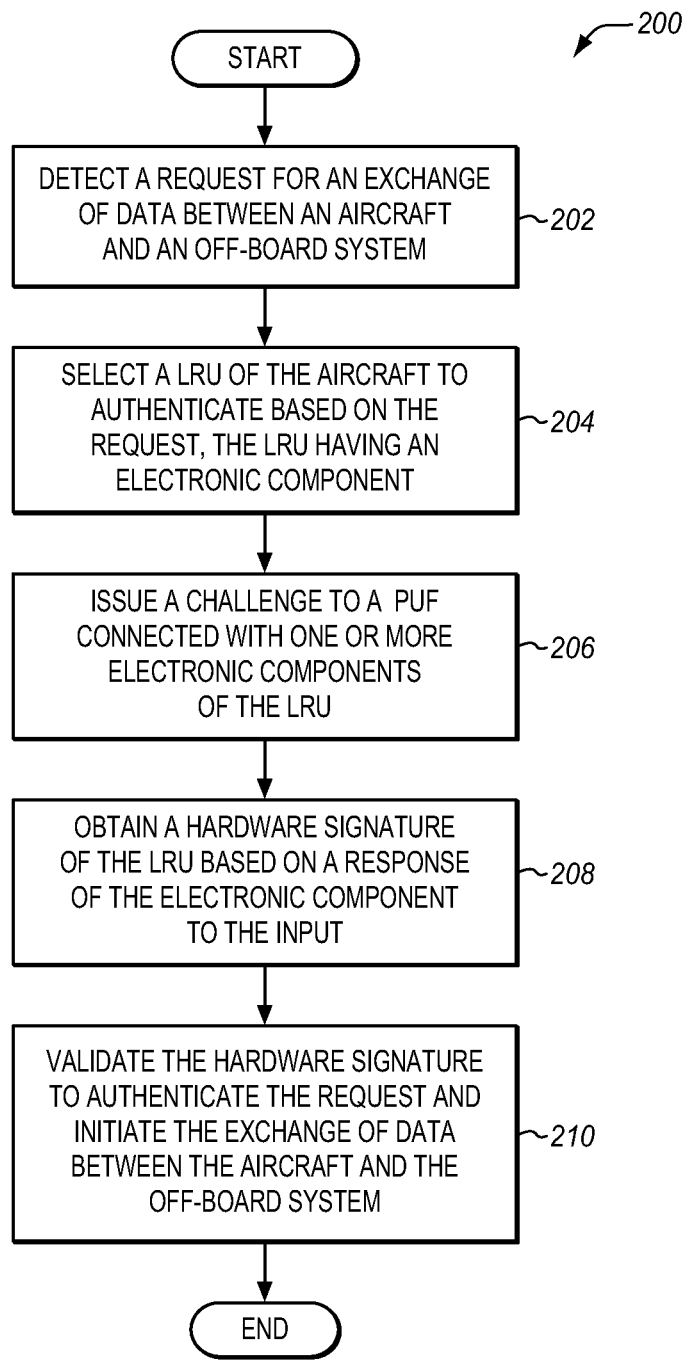
FIG. 2 is a flowchart of a method for authenticating an aircraft data exchange in an exemplary embodiment.

FIG. 2 is a flowchart of a method 200 for authenticating an aircraft data exchange in an exemplary embodiment. The steps of method 200 will be described with reference to FIG. 1, but those skilled in the art will appreciate that method 200 may be performed in other systems. The steps of the flowchart(s) described herein are not all inclusive and may include other steps not shown. The steps described herein may also be performed in an alternative order.

In step 202, the hardware authentication system 150 detects a request for an exchange of aircraft data between an aircraft 130 and the off-board system 110. The request may originate from either the off-board system 110 or the aircraft 130, may be manually initiated as a message sent over the network 120, and/or may be automatically generated in response to detecting the aircraft 130 is within range of the network 120 and/or that a connection is established between the off-board system 110 and the aircraft 130. The request may include or be accompanied with parameters that indicate a source/target of the request, a source/target for the aircraft data, a type of aircraft data, a security level of the aircraft data, whether the request is for an upload or download operation of the aircraft data, the identity or type of network 120 or interface establishing the connection, etc.

In step 204, the hardware authentication system 150 selects an LRU 140 of the aircraft 130 based on a parameter of the request. The hardware authentication system 150 may analyze data and/or metadata of the request to identify one or more parameters. The hardware authentication system 150 may also store/access a correlation of parameters, LRUs 140, and data security levels to determine the appropriate LRUs 140 to select for the request. Alternatively or additionally, the hardware authentication system 150 may select one or more airline devices 112 of the off-board system 110 based on at least one parameter of the request.

In step 206, the hardware authentication system 150 issues a challenge to the PUF 144 connected with one or more electronic components 142 of the LRU 140. In doing so, the PUF signature circuit 152 may obtain an address for the LRU(s) 140, the electronic component(s) 142, and/or the PUF(s) 144 which are relevant to the selection of step 204. The PUF signature circuit 152 may retrieve the challenge from a database that stores challenge-response pairs for the LRUs 140 of the aircraft(s) 130, and send the challenge over the network 120 as a targeted message that directly or indirectly prompts the PUF(s) 144 of the selected LRU(s) 140. Alternatively or additionally, the hardware authentication system 150 may issue a challenge to the PUF 116 connected with one or more electronic components 114 in the airline device 112 of the off-board system 110 in a similar manner to that described above.

In step 208, the hardware authentication system 150 obtains a hardware signature of the LRU 140 based on a response of the one or more electronic components 142 to the challenge. The PUF signature circuit 152 may listen for a response from the PUF 144 to the challenge and/or retrieve/receive the response over the network 120. The PUF 144 is configured to use the unique physical characteristics of the electronic components 142 of the LRU 140 to dynamically derive a unique hardware signature that distinguishes the LRU 140 from other LRUs, including LRUs of the same type and manufacturing installed in another aircraft belonging to the same fleet. The PUF signature circuit 152 and/or the PUF 144 may generate the hardware signature by using error-correction techniques to manage noise in the PUF 144 response and/or applying one or more cryptographic techniques. In other words, the raw measurement/data in the response of the PUF 144 may be post-processed to compensate for random fluctuations in the PUF response and to further protect against security breaches. Alternatively or additionally, the hardware authentication system 150 may obtain a hardware signature of the airline device 112 of the off-board system 110 in a similar manner to that described above.

In step 210, the hardware authentication system 150 validates the hardware signature to authenticate the request and initiate the exchange of data between the aircraft 130 and the off-board system 110. In doing so, the PUF signature circuit 152 may compare the hardware signature generated with the PUF 144 with a trusted entity that maps challenge-response pairs with LRU identifiers (IDs) and/or aircraft IDs (e.g., tail IDs) for a fleet of aircrafts 130. Thus, the PUF signature circuit 152 may determine whether the LRU 140 and/or the aircraft 130 are the correct and authentic source/target for participating in the requested data exchange. Alternatively or additionally, the hardware authentication system 150 may validate the hardware signature of the PUF 116 in the airline device 112 of the off-board system 110 in a similar manner.

Using the method 200, the hardware authentication module 150 enables generation of a unique hardware signature of an LRU 140 of the aircraft 130 "on-the-fly" by using intrinsic properties of the electronic components 142. Since the hardware signature may be produced based on the physical structure of the electronic component(s) 142, the unique signature which represents the LRU 140 need not be stored in any memory on-board the aircraft thereby improving security over that store digital keys in memory. Furthermore, since authentication of the aircraft 130 is based on unique physical properties of the LRU 140 itself, hardware signatures may be obtained for validation without any maintenance to continually update expired certificates over time. Still further, authentication based on the PUF 144 of the LRU 140 distinguishes the LRU 140 from other LRUs of the same type or manufacture in manner that is difficult if not impossible to replicate since the hardware signature may be obtained from the aircraft 130 without storing a copy of the signature on the aircraft 130.

Figure 3:
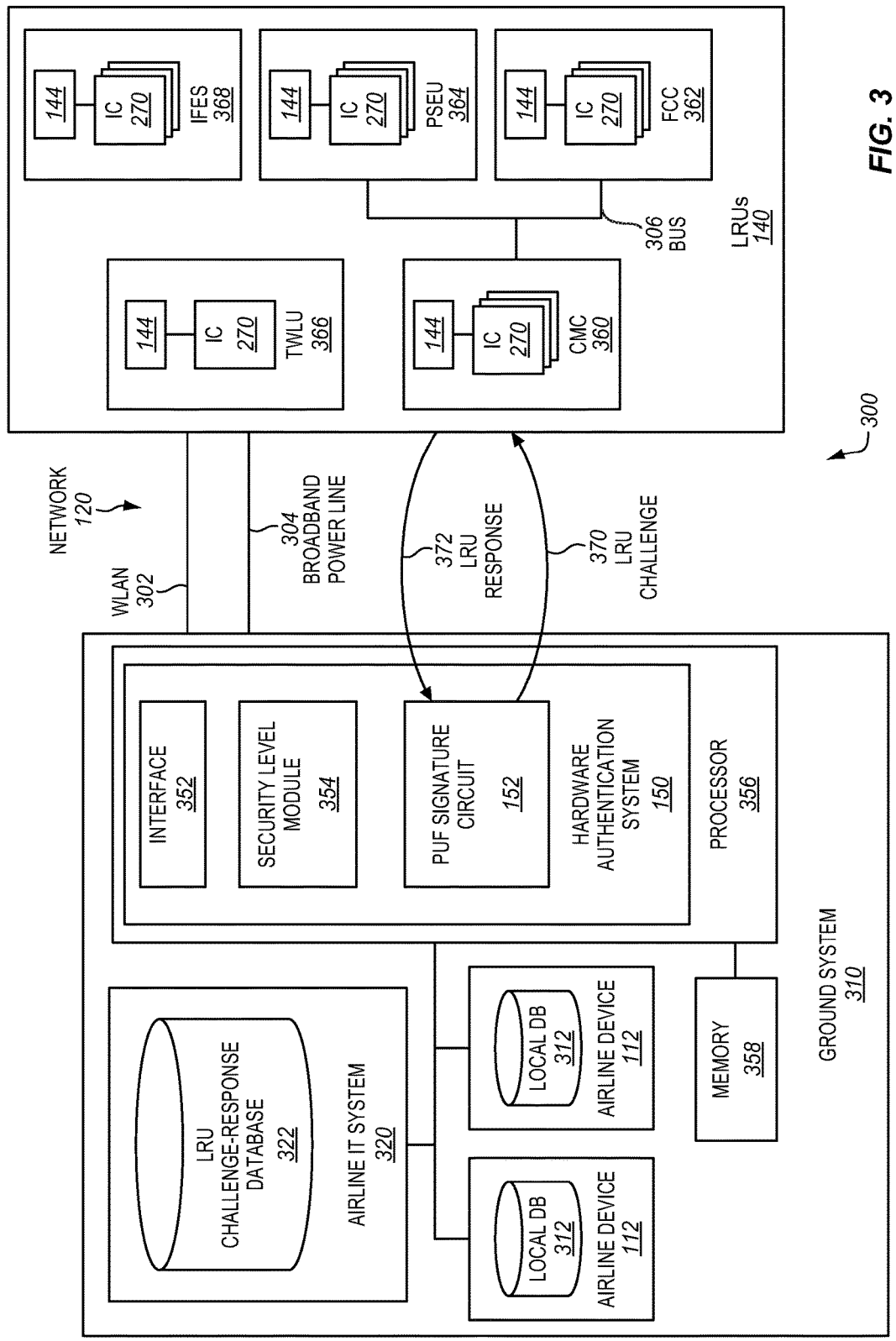
FIG. 3 illustrates a system for exchanging aircraft data in another exemplary embodiment.

FIG. 3 illustrates a system 300 for exchanging aircraft data in another exemplary embodiment. System 300 includes a ground system 310 operated by an airline that deploys airline devices 112 for exchanging data with aircrafts 130 (not shown in FIG. 3) under the management of an airline IT system 320 which, among other backend components, may include an LRU challenge-response database 322. The airline devices 112 are operable to request the upload or download of aircraft data to or from the LRUs 140 of an aircraft 130. The airline devices 112 may also be cleared to upload/download aircraft data to/from the LRUs 140 of an aircraft 130 given appropriate authorization established by the hardware authentication system 150 included in the ground system 310.

As shown in this example, the LRUs 140 include a Central Maintenance Computer (CMC) 360, a Flight Control Computer (FCC) 362, a Proximity Sensor Electronics Unit (PSEU) 364, a terminal wireless LAN unit (TWLU) 366, and an In-Flight Entertainment System (IFES) 368. Each LRU 140 may include one or more integrated circuits (ICs) 270 integrated with a PUF 144, and the LRUs 140 may be linked with one another via a bus 306. For instance, the CMC 360 may maintain aircraft data for other LRUs 140 of the aircraft 130 such as the FCC 362, PSEU 364, etc., via one or more buses 306, file servers 134, etc., of the aircraft 130. Additionally, certain LRUs 140 of the aircraft 130, such as the TWLU 366, may comprise a component of the communication system 132 that exchange data for a particular segment of the network 120 such as the WLAN 302. In that regard, an LRU 140 may comprise a broadband power line module that establishes a power and data connection with the ground system 310 via the broadband power line 304. As described in greater detail below, the different segments of the network 120 may simultaneously exchange data and/or exchange different types of aircraft data for particular types of LRUs 140 or security levels.

The hardware authentication system 150 includes a PUF signature circuit 152, an interface 352, and a security level module 354. The interface 352 is operable to facilitate the exchange of aircraft data between the ground system 310 (e.g., airline devices 112 and airline IT system 320) and the LRUs 140 of the aircraft 130 via a WLAN 302 and/or broadband power line 304 that link the aircraft 130 to the ground system 310 as part of the network 120. The security level module 354 is operable to determine one or more security levels for the aircraft data of a requested exchange. The PUF signature circuit 152 may use the security level module 354 to send/receive specific sets of LRU challenges 370 and responses 372 based on mapping information obtained from the LRU challenge-response database 322. As described in greater detail below, this enables the PUF signature circuit 152 to perform a series of cross-checks that adapt the authentication to varying security levels.

While the specific hardware implementation of the hardware authentication system 150 is subject to design choices, one particular embodiment may include one or more processors 356 coupled with a memory 358. Processor 356 includes any hardware device that is able to perform functions. Processor 356 may include one or more Central Processing Units (CPU), microprocessors, Digital Signal Processors (DSPs), Application-specific Integrated Circuits (ASICs), etc. Some examples of processors include Intel® Core™ processors, Advanced Reduced Instruction Set Computing (RISC) Machines (ARM®) processors, etc. Memory 358 includes any hardware device that is able to store data.

Memory 358 may include one or more volatile or non-volatile Dynamic Random Access Memory (DRAM) devices, FLASH devices, volatile or non-volatile Static RAM devices, hard drives, Solid State Disks (SSDs), etc. Some examples of non-volatile DRAM and SRAM include battery-backed DRAM and battery-backed SRAM.

FIG. 4 is a flowchart of a method 400 for authenticating an aircraft data exchange in an exemplary embodiment. The steps of method 400 will be described with reference to FIGS. 1 and 3, but those skilled in the art will appreciate that method 400 may be performed in other systems. The steps of the flowchart(s) described herein are not all inclusive and may include other steps not shown. The steps described herein may also be performed in an alternative order.

In step 402, the security level module 354 determines a security level for requested aircraft data. The security level module 354 may advantageously determine the security level based on, for example, the type of data and/or associated sensitivity thereof, the type of LRU 140 related to the data exchange or otherwise impacted by or involved with the data exchange, the user or type of the airline device 112 to be involved in the requested data exchange, whether the exchange requested is an upload or download operation, and/or the segment of the network 120 to be involved in the requested exchange. For instance, the security level module 354 may determine that uploading aircraft data to the aircraft 130 involves a higher level of security than downloading. The security level module 354 may further classify data of an upload and/or download into one of several security domains. For example, upload operations may be further distinguished into one of several domains of security levels in decreasing order, including an Aircraft Control Domain (ACD), Airplane Information Systems (AIS), In-Flight Entertainment (IFE), and passenger data. Thus, the security level module 354 may determine a higher level of security for uploading data to the FCC 362 associated with the ACD compared with the security level for uploading data to the IFES 368 in the IFE domain. Numerous combinations of security domain configurations are possible.

In step 404, the security level module 354 selects a combination of LRUs 140 of the aircraft 130 based on the security level. For example, a combination of LRUs 140 may be selected based on a determination that the security level of the data is above a threshold, or a predetermined combination of LRUs 140 may be associated with a particular security level. And, in step 406, the PUF signature circuit 152 obtains hardware signature(s) using the PUFs 144 connected to the ICs 270 of the combination of LRUs 140. The security level module 354 may associate any number of different security levels with numerous configurations and combinations of the LRU 140. For example, for aircraft data associated with a relatively higher level of security sensitivity, the security level module 354 may select a correspondingly higher number of LRUs 140 for the PUF signature circuit 152 to interact with to obtain the combined hardware signature compared with aircraft data with lower levels of security sensitivity. In one embodiment, the security level module 354 may determine to issue a challenge to all LRUs 140 of the aircraft 130 to support a full trust model that enables full function of aircraft data exchanges including data loads, software/firmware updates, etc. In one embodiment, the security level module 354 applies different segments of the aircraft data to be exchanged to different security levels and proceeds to authenticate with different LRU 140 combinations.

In step 408, the hardware authentication system 150 determines whether a match exists between the hardware signature(s) of each LRU 140 in the combination and the LRU challenge-response database 322 of the airline IT system 320. The airline IT system 320 may store/access the LRU ID or serial number of each LRU 140 of a fleet (e.g., all or almost all LRUs 240 for a group of aircrafts 130 under control of the airline). The airline IT system 320 may also store/access sets of challenge-response pairs in the LRU challenge-response database 322 and/or correlate the challenge-response pairs with the LRU IDs (e.g., using database 320).

A trusted entity (e.g., the manufacturer of the aircraft 130 or LRU 140, the airline operating the airline IT system 320, a trusted third party, etc.) may determine challenge-response pairs for each the LRUs 140 at some time in advance (e.g., shortly after manufacture of the aircraft 130 and/or LRU 140) and securely distribute the challenge-response pairs to the LRU challenge-response database 322. Additionally, a subset of the challenge-response pairs may be securely distributed to the local databases 312 of the airline devices 112. If the local database 312 has one at least one challenge-response pair for the LRU 140, then the airline device 112 may perform the authentication of the aircraft data exchange, the aircraft 130, and/or the LRU 140. The airline device 112 and/or airline IT system 320 may advantageously delete challenge-response entries of their respective databases 312/320 as challenges are sent/retrieved/used by the hardware authentication system 150 to ensure high security. Thus, the hardware authentication system 150 may determine whether matches exist by obtaining mapping information of LRU IDs and challenge-response pairs from the airline IT system 320 and/or the airline device 112. Alternatively or additionally, the hardware authentication system 150 may request or receive confirmations from the airline IT system 320 and/or the airline device 112 of matches/mismatches.

If all matches are confirmed to exist in step 408, the method 400 proceeds to step 412 and the hardware authentication system 150 validates the hardware signatures and allows the data exchange to initiate. Otherwise, if there are one or more mismatches in step 408, the method 400 proceeds to step 410 and the hardware authentication system 150 issues a warning message or flag that prompts one or more users of the ground system 310 and/or aircraft 130 for follow-up action. Alternatively or additionally, the hardware authentication system 150 may restrict the data exchange entirely or in part based on, for example, the number of mismatches, a security level associated with a particular mismatch, and/or a determination that a collective security level associated with the mismatches exceeds a threshold. For instance, in response to determining that a single mismatch occurred for a medium security level associated with the IFES 368, the hardware authentication system 150 may preclude remote data load functionality but otherwise authenticate and allow the aircraft data exchange to proceed.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method comprising
detecting, at a first aircraft, a request to transmit data with a second aircraft;
issuing, from the first aircraft, a challenge to a Physically Unclonable Function (PUF) connected with at least one electronic component of a Line Replaceable Unit (LRU) of the second aircraft;
obtaining, at the first aircraft, a hardware signature of the second aircraft that is generated based on a response of the PUF to the challenge; and
authenticating, at the first aircraft, the request to transmit data with the second aircraft based on the hardware signature.

2. The method of claim 1 further comprising:
selecting, at the first aircraft, the LRU of the second aircraft based on at least one parameter of the request.

3. The method of claim 2 wherein:
the at least one parameter of the request includes a type of aircraft data to transmit.

4. The method of claim 2 wherein:
the at least one parameter of the request indicates an upload operation from the second aircraft to the first aircraft.

5. The method of claim 1 further comprising:
determining a security level of the data in the request;
selecting a combination of LRUs based on the security level of the data;
obtaining hardware signatures using PUFs connected with the combination of LRUs; and
authenticating the request to transmit data with the second aircraft based on the hardware signatures.

6. The method of claim 1 further comprising:
validating, at the first aircraft, an identity of the second aircraft based on a match between the hardware signature and a challenge-response pair entry in a database; and
authorizing transmission of data with the second aircraft in response to validation of the identity of the second aircraft; and
deleting the challenge-response pair entry from the database in response to the authorizing.

7. A non-transitory computer readable medium embodying programmed instructions which, when executed by a processor, are operable for performing a method comprising:
detecting, at a first aircraft, a request to transmit data with a second aircraft;
issuing, from the first aircraft, a challenge to a Physically Unclonable Function (PUF) connected with at least one electronic component of a Line Replaceable Unit (LRU) of the second aircraft;
obtaining, at the first aircraft, a hardware signature of the second aircraft that is generated based on a response of the PUF to the challenge; and
authenticating, at the first aircraft, the request to transmit data with the second aircraft based on the hardware signature.

8. The medium of claim 7 wherein the method further comprises:
selecting, at the first aircraft, the LRU of the second aircraft based on at least one parameter of the request.

9. The medium of claim 8 wherein:
the at least one parameter of the request includes a type of aircraft data to transmit.

10. The medium of claim 8 wherein:
the at least one parameter of the request indicates an upload operation from the second aircraft to the first aircraft.

11. The medium of claim 7 wherein the method further comprises:
determining a security level of the data in the request;
selecting a combination of LRUs based on the security level of the data;
obtaining hardware signatures using PUFs connected with the combination of LRUs; and
authenticating the request to transmit data with the second aircraft based on the hardware signatures.

12. The medium of claim 11 wherein the method further comprises:
validating, at the first aircraft, an identity of the second aircraft based on a match between the hardware signature and a challenge-response pair entry in a database; and
authorizing transmission of data with the second aircraft in response to validation of the identity of the aircraft; and
deleting the challenge-response pair entry from the database in response to the authorizing.

13. An aircraft comprising:
a hardware authentication system configured to detect a request to transmit data with a second aircraft, to issue a challenge to a Physically Unclonable Function (PUF) connected with at least one electronic component of a Line Replaceable Unit (LRU) of the second aircraft, to obtain a hardware signature of the second aircraft that is generated based on a response of the PUF to the challenge, and to authenticate the request to transmit data with the second aircraft based on the hardware signature.

14. The aircraft of claim 13 wherein:
the hardware authentication system is further configured to identify a security level associated with the LRU of the second aircraft, to determine that the security level is above a threshold, and in response, and to identify at least one additional LRU of the second aircraft for authenticating the request.

15. The aircraft of claim 13 wherein:
the hardware authentication system is further configured to generate a warning in response to a determination that there is a mismatch between the hardware signature and a challenge-response pair.

16. The aircraft of claim 13 wherein:
the hardware authentication system is further operable to restrict transmission of the data in response to a determination that there is a mismatch between the hardware signature and a challenge-response pair.

17. The aircraft of claim 13 wherein:
the hardware authentication system is further operable to obtain hardware signatures for multiple line replaceable units (LRUs) of the second aircraft, each LRU having at least one electronic component coupled with Physically Unclonable Function (PUF) circuitry.

18. A method comprising
detecting, at a first aircraft, a request to transmit data with a second aircraft;
determining a security level of the data in the request;
selecting a combination of Line Replaceable Units (LRUs) of the second aircraft based on the security level of the data;
obtaining, at the first aircraft, hardware signatures of the second aircraft using Physically Unclonable Functions (PUFs) connected with the combination of LRUs; and
authenticating, at the first aircraft, the request to transmit data with the second aircraft based on the hardware signatures.

19. A non-transitory computer readable medium embodying programmed instructions which, when executed by a processor, are operable for performing a method comprising:
detecting, at a first aircraft, a request to transmit data with a second aircraft;
determining a security level of the data in the request;
selecting a combination of Line Replaceable Units (LRUs) of the second aircraft based on the security level of the data;
obtaining, at the first aircraft, hardware signatures of the second aircraft using Physically Unclonable Functions (PUFs) connected with the combination of LRUs; and
authenticating, at the first aircraft, the request to transmit data with the second aircraft based on the hardware signatures.

20. An aircraft comprising:
a hardware authentication system configured to detect a request to transmit data with a second aircraft, to determine a security level of the data in the request, to select a combination of Line Replaceable Units (LRUs) of the second aircraft based on the security level of the data, to obtain hardware signatures of the second aircraft using Physically Unclonable Functions (PUFs) connected with the combination of LRUs, and to authenticate the request to transmit data with the second aircraft based on the hardware signatures.

* * * * *